US011990265B2

(12) United States Patent
Tanabe et al.

(10) Patent No.: US 11,990,265 B2
(45) Date of Patent: May 21, 2024

(54) MULTILAYER COIL COMPONENT

(71) Applicant: Murata Manufacturing Co., Ltd., Kyoto-fu (JP)

(72) Inventors: Shimpei Tanabe, Nagaokakyo (JP); Morihiro Hamano, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 707 days.

(21) Appl. No.: 16/547,475

(22) Filed: Aug. 21, 2019

(65) Prior Publication Data

US 2020/0075221 A1 Mar. 5, 2020

(30) Foreign Application Priority Data

Aug. 31, 2018 (JP) ................................ 2018-163664

(51) Int. Cl.
*H01F 27/28* (2006.01)
*H01F 27/29* (2006.01)

(52) U.S. Cl.
CPC ......... *H01F 27/2804* (2013.01); *H01F 27/29* (2013.01); *H01F 2027/2809* (2013.01)

(58) Field of Classification Search
CPC ......... H01F 27/2804; H01F 2027/2809; H01F 17/0013; H01F 17/0006; H01F 5/003; H01F 27/29; H01F 27/292
USPC .................................................. 336/200, 232
See application file for complete search history.

(56) References Cited

U.S. PATENT DOCUMENTS

| | | | | |
|---|---|---|---|---|
| 5,598,135 A * | 1/1997 | Maeda | H01F 17/0013 336/200 |
| 2003/0164533 A1* | 9/2003 | Tada | H01F 17/0006 257/531 |
| 2009/0003191 A1* | 1/2009 | Inuzuka | H01F 17/0013 369/283 |
| 2012/0032767 A1* | 2/2012 | Iwasaki | H01F 27/292 336/200 |
| 2013/0222101 A1* | 8/2013 | Ito | H01F 3/08 336/83 |

(Continued)

FOREIGN PATENT DOCUMENTS

| | | |
|---|---|---|
| CN | 107887105 A | 4/2018 |
| JP | 2001-044039 A | 2/2001 |

(Continued)

OTHER PUBLICATIONS

English translation of JP2010206089A (Year: 2010).*

(Continued)

*Primary Examiner* — Tszfung J Chan
(74) *Attorney, Agent, or Firm* — Studebaker & Brackett PC

(57) ABSTRACT

A multilayer coil component includes an element body that includes a plurality of insulating layers laminated together, a coil that is embedded in the element body and that includes a coil conductor layer provided between the insulating layers, and a first outer electrode and a second outer electrode each of which is provided on at least one of outer surfaces of the element body and each of which is electrically connected to the coil. A dissimilar-material layer that is made of a material different from the insulating layers is provided on at least one of the outer surfaces of the element body that extend in a lamination direction in which the plurality of insulating layers are laminated together.

17 Claims, 9 Drawing Sheets

(56) References Cited

U.S. PATENT DOCUMENTS

| | | | | |
|---|---|---|---|---|
| 2014/0191838 | A1* | 7/2014 | Yoshida | H01F 27/2804 336/200 |
| 2015/0371754 | A1* | 12/2015 | Im | H01F 17/0033 336/200 |
| 2015/0371755 | A1* | 12/2015 | Im | H01F 17/0013 336/200 |
| 2016/0189850 | A1* | 6/2016 | Lee | H01F 27/292 336/200 |
| 2017/0345549 | A1 | 11/2017 | Moon | |
| 2018/0096778 | A1* | 4/2018 | Yatabe | H01G 4/30 |

FOREIGN PATENT DOCUMENTS

| | | | | | |
|---|---|---|---|---|---|
| JP | 2001044039 | A | * | 2/2001 | |
| JP | 2001-060514 | A | | 3/2001 | |
| JP | 2010165973 | A | * | 7/2010 | |
| JP | 2010-206089 | A | | 9/2010 | |
| JP | 2010206089 | A | * | 9/2010 | |
| JP | 2013-183009 | A | | 9/2013 | |
| JP | 2013183009 | A | * | 9/2013 | |
| JP | 2013-254977 | A | | 12/2013 | |
| JP | 2017-216427 | A | | 12/2017 | |
| JP | 2018-061008 | A | | 4/2018 | |
| KR | 2013046108 | A | * | 5/2013 | H01F 17/0013 |
| KR | 101449518 | B1 | * | 10/2014 | |

OTHER PUBLICATIONS

English translation of JP2000133521A (Year: 2000).*

English translation of JP2003338410A (Year: 2003).*

An Office Action; "Notice of Reasons for Refusal," mailed by the Japanese Patent Office on May 25, 2021, which corresponds to Japanese Patent Application No. 2018-163664 and is related to U.S. Appl. No. 16/547,475 with English language translation.

An Office Action; "Notice of Reasons for Refusal," mailed by the Japanese Patent Office on Jan. 12, 2021, which corresponds to Japanese Patent Application No. 2018-163664 and is related to U.S. Appl. No. 16/547,475 with English language translation.

An Office Action mailed by China National Intellectual Property Administration on Aug. 27, 2021 which corresponds to Chinese Patent Application No. 201910807019.X and is related to U.S. Appl. No. 16/547,475 with English language translation.

* cited by examiner

MULTILAYER COIL COMPONENT

CROSS-REFERENCE TO RELATED APPLICATION

This application claims benefit of priority to Japanese Patent Application No. 2018-163664, filed Aug. 31, 2018, the entire content of which is incorporated herein by reference.

BACKGROUND

Technical Field

The present disclosure relates to a multilayer coil component.

Background Art

For example, as described in Japanese Unexamined Patent Application Publication No. 2013-254977, a multilayer coil component includes a multilayer body that includes a plurality of insulating layers laminated together, two outer electrodes that are provided on side surfaces of the multilayer body, the side surfaces extending in a lamination direction of the plurality of insulating layers and opposing each other, and a plurality of coil conductors that are laminated together with the insulating layers so as to form a coil and that are superposed with one another so as to form a substantially annular path when viewed in plan view in the lamination direction.

Japanese Unexamined Patent Application Publication No. 2013-254977 describes that the insulating layers are made of a material containing glass as a main component. However, in such a multilayer coil component, there is room for improvement in characteristics such as inductance and strength.

SUMMARY

Accordingly, the present disclosure provides a multilayer coil component capable of improving characteristics such as inductance and strength.

A multilayer coil component according to preferred embodiments of the present disclosure includes an element body that includes a plurality of insulating layers laminated together, a coil that is embedded in the element body and that includes a coil conductor layer provided between the insulating layers, and a first outer electrode and a second outer electrode each of which is provided on at least one of outer surfaces of the element body and each of which is electrically connected to the coil. A dissimilar-material layer that is made of a material different from the insulating layers is provided on at least one of the outer surfaces of the element body that extend in a lamination direction in which the plurality of insulating layers are laminated together.

According to preferred embodiments of the present disclosure, a multilayer coil component capable of improving characteristics such as inductance and strength can be provided.

Other features, elements, characteristics and advantages of the present disclosure will become more apparent from the following detailed description of preferred embodiments of the present disclosure with reference to the attached drawings.

DETAILED DESCRIPTION

A multilayer coil component according to preferred embodiments of the present disclosure will be described below.

However, the present disclosure is not limited to the following embodiments, and modifications may be suitably made within the gist of the present disclosure. Note that a configuration that is obtained by combining two or more desirable individual configurations that will be described below is also included in the scope of the present disclosure.

The embodiments that will be described below are examples, and it is obvious that the configurations according to the different embodiments may be partially replaced with one another or may be combined with one another. In a second embodiment and the subsequent embodiments, descriptions of matters that are common to a first embodiment will be omitted, and only differences will be described. In particular, similar advantageous effects obtained with similar configurations will not be described in every embodiment.

First Embodiment

In a multilayer coil component according to the first embodiment of the present disclosure, a lamination direction is the same as a direction in which a mounting surface extends.

Figure 1:
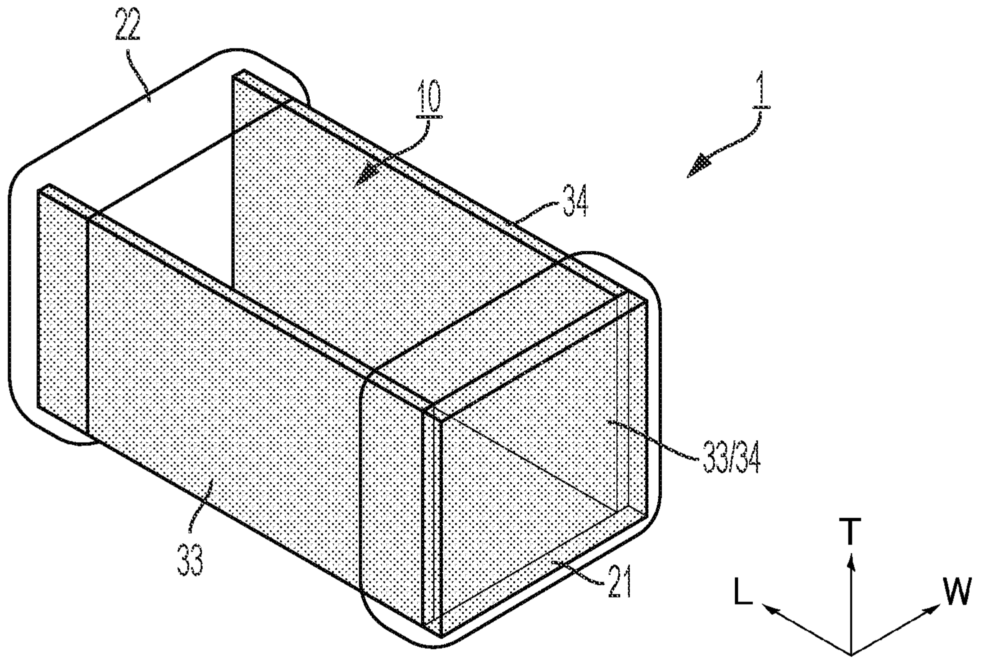
FIG. 1 is a perspective view schematically illustrating an example of a multilayer coil component according to a first embodiment of the present disclosure.

FIG. 1 is a perspective view schematically illustrating an example of a multilayer coil component according to the first embodiment of the present disclosure.

A multilayer coil component 1 that is illustrated in FIG. 1 includes an element body 10, a first outer electrode 21, a second outer electrode 22, and dissimilar-material layers 33 and 34. The first outer electrode 21 and the second outer electrode 22 are provided on outer surfaces of the element body 10, and the dissimilar-material layers 33 and 34 are each provided on one of the outer surfaces of the element body 10. Although the configuration of the element body 10 will be described later, the element body 10 includes a plurality of insulating layers that are laminated together, and a coil is embedded in the element body 10.

In the multilayer coil component 1 and the element body 10, which are illustrated in FIG. 1, a length direction, a width direction, and a height direction respectively correspond to an L direction, a W direction, and a T direction in FIG. 1. Here, the length direction (L direction), the width direction (W direction), and the height direction (T direction) are perpendicular to one another.

Figure 2:
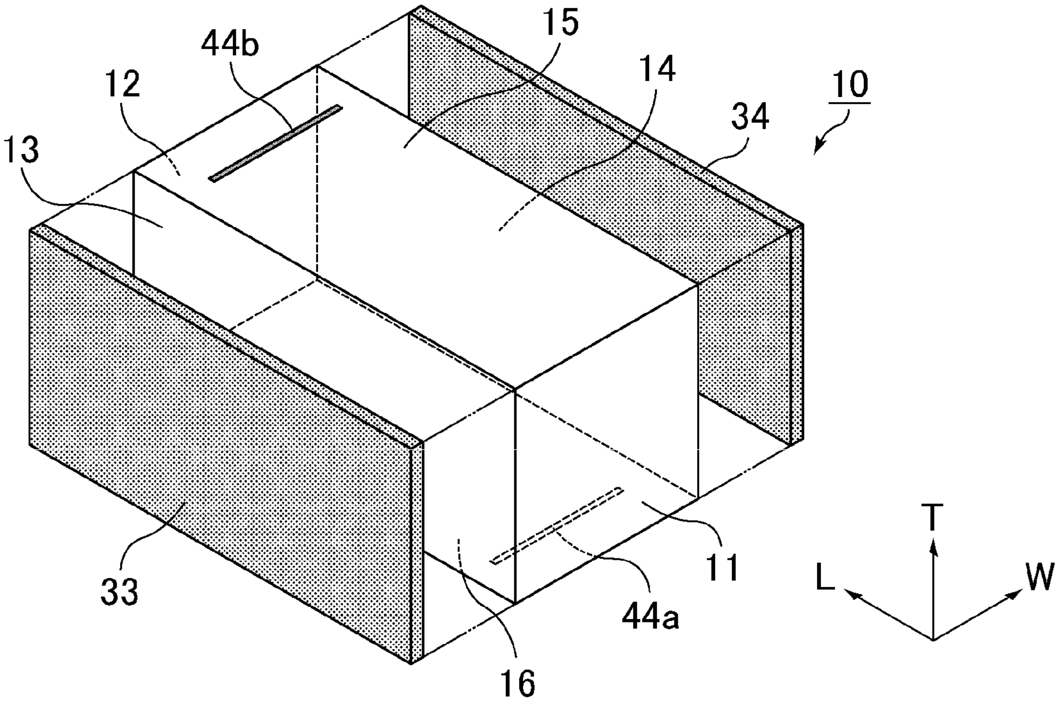
FIG. 2 is an exploded perspective view schematically illustrating examples of an element body and dissimilar-material layers that are included in the multilayer coil component illustrated in FIG. 1.

FIG. 2 is an exploded perspective view schematically illustrating examples of the element body and the dissimilar-material layers that are included in the multilayer coil component illustrated in FIG. 1.

The element body 10 illustrated in FIG. 2 has a rectangular parallelepiped shape or a substantially rectangular parallelepiped shape and has a first end surface 11, a second end surface 12, a first side surface 13, a second side surface 14, a first main surface 15, and a second main surface 16. The first end surface 11 and the second end surface 12 oppose each other in the length direction (L direction). The first side surface 13 and the second side surface 14 oppose each other in the width direction (W direction). The first main surface 15 and the second main surface 16 oppose each other in the height direction (T direction).

It is preferable that corner portions and ridge line portions of the element body 10 be rounded. Each of the corner portions is a portion at which three surfaces of the element body 10 intersect one another, and each of the ridge line portions is a portion at which two surfaces of the element body 10 intersect each other.

In FIG. 1, the first outer electrode 21 covers the entire first end surface 11 of the element body 10 and partially covers the first side surface 13, the second side surface 14, the first main surface 15, and the second main surface 16 of the element body 10. The second outer electrode 22 covers the entire second end surface 12 of the element body 10 and partially covers the first side surface 13, the second side surface 14, the first main surface 15, and the second main surface 16 of the element body 10.

Figure 3:
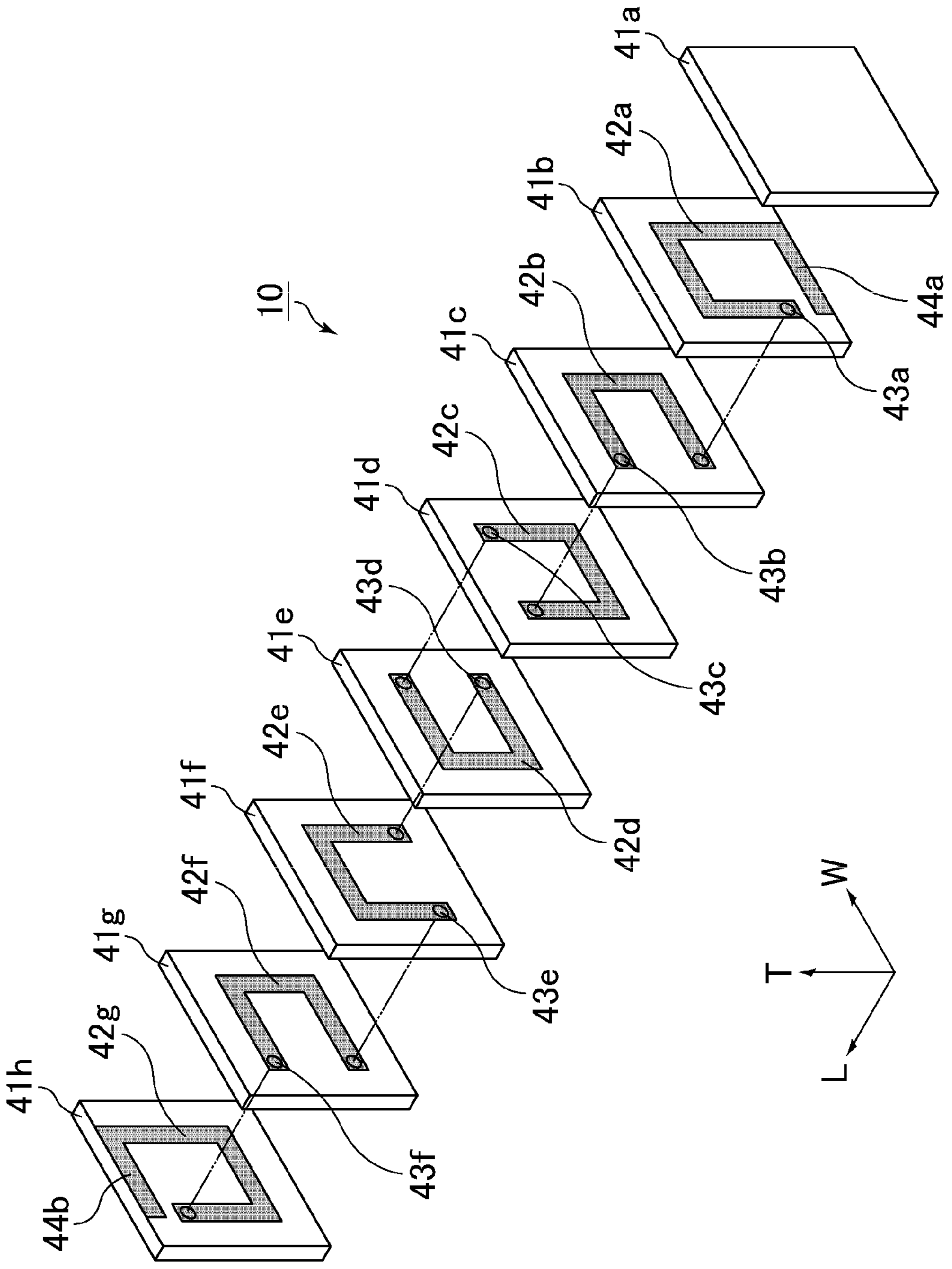
FIG. 3 is an exploded perspective view of the element body illustrated in FIG. 2.

FIG. 3 is an exploded perspective view of the element body illustrated in FIG. 2.

As illustrated in FIG. 3, the element body 10 includes a plurality of insulating layers 41*a*, 41*b*, 41*c*, 41*d*, 41*e*, 41*f*, 41*g*, and 41*h* that are laminated together in the length direction (L direction). Accordingly, in FIG. 1, FIG. 2, and FIG. 3, the length direction (L direction) corresponds to the lamination direction.

Coil conductor layers 42*a*, 42*b*, 42*c*, 42*d*, 42*e*, 42*f*, and 42*g* are respectively formed on main surfaces of the insulating layers 41*b*, 41*c*, 41*d*, 41*e*, 41*f*, 41*g*, and 41*h*. Each of the coil conductor layers 42*a* to 42*g* has a substantially cornered U-shape and has a length of about ¾ turns.

In addition, via conductors 43*a*, 43*b*, 43*c*, 43*d*, 43*e*, and 43*f* are respectively formed in the insulating layers 41*b*, 41*c*, 41*d*, 41*e*, 41*f*, and 41*g* such that these via conductors extend through the corresponding insulating layers in the lamination direction (the L direction in FIG. 3). A land is usually provided on the main surface of each of these insulating layers so as to be connected to the corresponding via conductor.

As described above, the coil conductor layers 42*a* to 42*g*, which are arranged between the insulating layers 41*a* to 41*h*, and the via conductors 43*a* to 43*f*, which extend through the insulating layers 41*a* to 41*h* in the lamination direction, are connected to one another, so that the coil that has a coil axis extending in the L direction is formed.

As illustrated in FIG. 3, the coil conductor layer 42*a* includes an extended portion 44*a*. As illustrated in FIG. 2, the extended portion 44*a* is exposed at the second main surface 16 of the element body 10, and the coil conductor layer 42*a* and the first outer electrode 21 are connected to each other by the extended portion 44*a*. Similarly, as illustrated in FIG. 3, the coil conductor layer 42*g* includes an extended portion 44*b*. As illustrated in FIG. 2, the extended portion 44*b* is exposed at the first main surface 15 of the element body 10, and the coil conductor layer 42*g* and the second outer electrode 22 are connected to each other by the extended portion 44*b*. Thus, the first outer electrode 21 and the second outer electrode 22 are each electrically connected to the coil.

As illustrated in FIG. 2, the dissimilar-material layer 33 is provided on the first side surface 13 of the element body 10, and the dissimilar-material layer 34 is provided on the second side surface 14 of the element body 10.

The first side surface 13 of the element body 10, on which the dissimilar-material layer 33 is provided, and the second side surface 14 of the element body 10, on which the dissimilar-material layer 34 is provided, extend in the L direction, which is the lamination direction in the element body 10, and thus, it can be said that the dissimilar-material layers 33 and 34 are provided on the outer surfaces of the element body 10 that extend in the L direction, which is the lamination direction.

In the case where the multilayer coil component 1, which is illustrated in FIG. 1, is mounted onto a substrate, the first main surface 15 or the second main surface 16 of the element body 10 serves as the mounting surface. Thus, in the multilayer coil component 1, which is illustrated in FIG. 1, the lamination direction (the L direction in FIG. 1) is the same as a direction in which the mounting surface extends.

Figure 4:
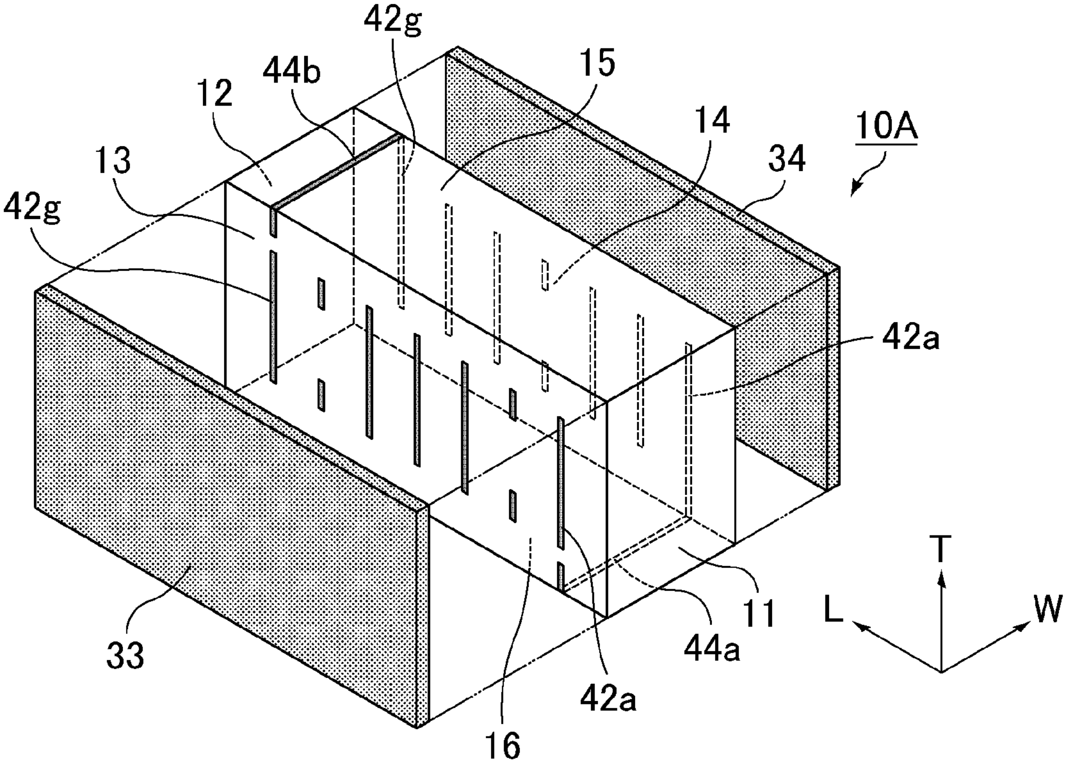
FIG. 4 is an exploded perspective view schematically illustrating other examples of the element body and the dissimilar-material layers that are included in the multilayer coil component according to the first embodiment of the present disclosure.

FIG. 4 is an exploded perspective view schematically illustrating other examples of the element body and the dissimilar-material layers that are included in the multilayer coil component according to the first embodiment of the present disclosure.

An element body 10A that is illustrated in FIG. 4 has a rectangular parallelepiped shape or a substantially rectangular parallelepiped shape and has the first end surface 11, the second end surface 12, the first side surface 13, the second side surface 14, the first main surface 15, and the second main surface 16. The first end surface 11 and the second end surface 12 oppose each other in the length direction (L direction). The first side surface 13 and the second side surface 14 oppose each other in the width direction (W direction). The first main surface 15 and the second main surface 16 oppose each other in the height direction (T direction). It is preferable that corner portions and ridge line portions of the element body 10A be rounded.

Figure 5:
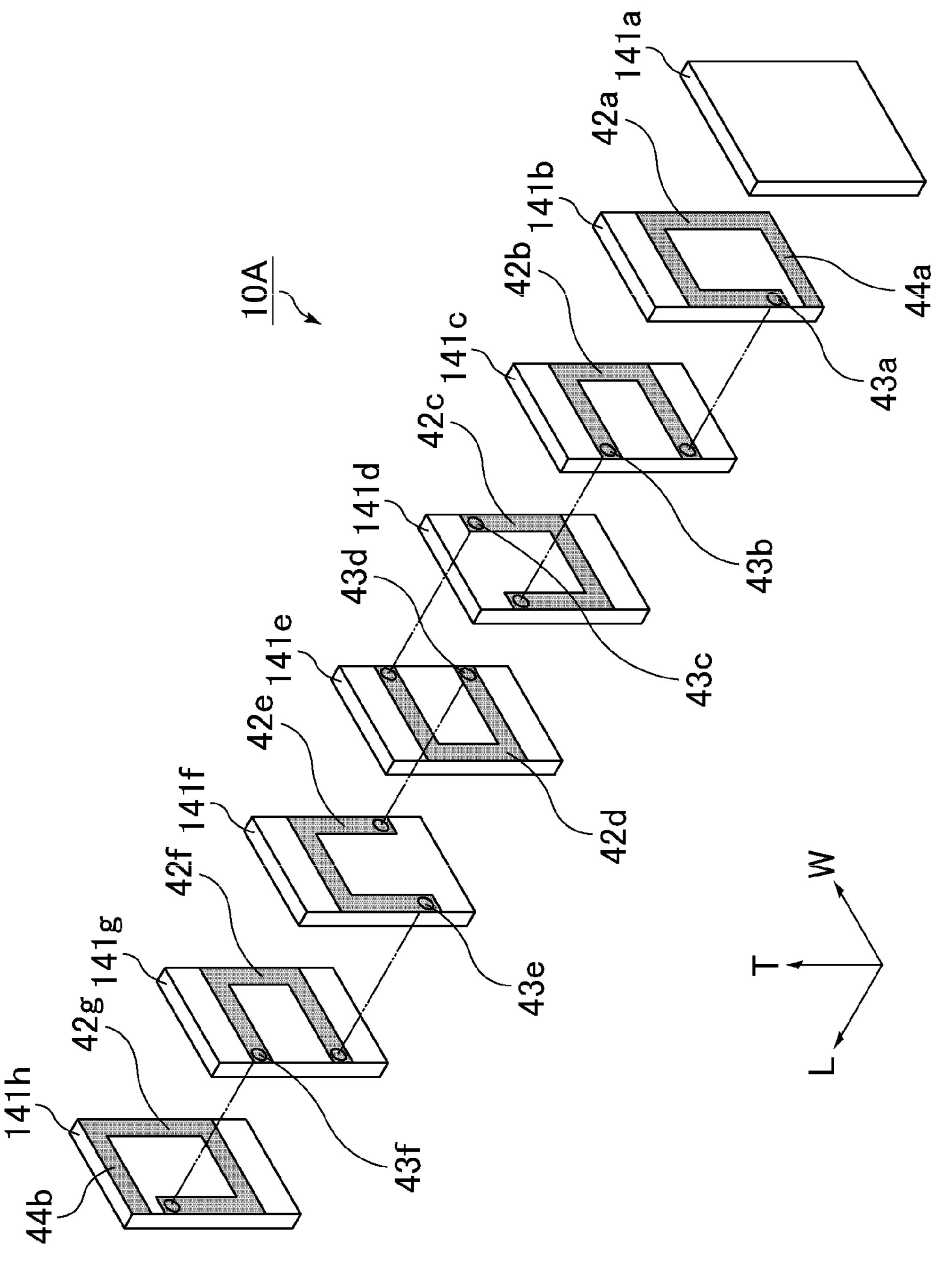
FIG. 5 is an exploded perspective view of the element body illustrated in FIG. 4.

FIG. 5 is an exploded perspective view of the element body illustrated in FIG. 4. As illustrated in FIG. 5, the element body 10A includes a plurality of insulating layers 141*a*, 141*b*, 141*c*, 141*d*, 141*e*, 141*f*, 141*g*, and 141*h* that are laminated together in the length direction (L direction). Accordingly, in FIG. 4 and FIG. 5, the length direction (L direction) corresponds to the lamination direction.

The coil conductor layers 42*a*, 42*b*, 42*c*, 42*d*, 42*e*, 42*f*, and 42*g* are respectively formed on main surfaces of the insulating layers 141*b*, 141*c*, 141*d*, 141*e*, 141*f*, 141*g*, and 141*h*. Each of the coil conductor layers 42*a* to 42*g* has a substantially cornered U-shape and has a length of about ¾ turns.

In addition, the via conductors 43*a*, 43*b*, 43*c*, 43*d*, 43*e*, and 43*f* are respectively formed in the insulating layers 141*b*, 141*c*, 141*d*, 141*e*, 141*f*, and 141*g* such that these via conductors extend through the corresponding insulating layers in the lamination direction (the L direction in FIG. 5). A land is usually provided on the main surface of each of these insulating layers so as to be connected to the corresponding via conductor.

As described above, the coil conductor layers 42*a* to 42*g*, which are arranged between the insulating layers 141*a* to 141*h*, and the via conductors 43*a* to 43*f*, which extend through the insulating layers 141*a* to 141*h* in the lamination direction, are connected to one another, so that the coil that has a coil axis extending in the L direction is formed.

As illustrated in FIG. 5, the coil conductor layer 42*a* includes the extended portion 44*a*. As illustrated in FIG. 4, the extended portion 44*a* is exposed at the second main surface 16 of the element body 10A, and the coil conductor layer 42*a* and the first outer electrode 21 are connected to each other by the extended portion 44*a*. Similarly, as illustrated in FIG. 5, the coil conductor layer 42*g* includes the extended portion 44*b*. As illustrated in FIG. 4, the extended portion 44*b* is exposed at the first main surface 15 of the element body 10A, and the coil conductor layer 42*g* and the second outer electrode 22 are connected to each other by the extended portion 44*b*. Thus, the first outer electrode 21 and the second outer electrode 22 are each electrically connected to the coil.

The element body 10A illustrated in FIG. 4 has a configuration that is similar to that of the element body 10 illustrated in FIG. 2 except that the coil conductor layers 42*a* to 42*g* are exposed between the insulating layers 141*a* to 141*h*. As illustrated in FIG. 4, the dissimilar-material layer 33 is provided on the first side surface 13 of the element body 10A, and the dissimilar-material layer 34 is provided on the second side surface 14 of the element body 10A.

The first side surface 13 of the element body 10A, on which the dissimilar-material layer 33 is provided, and the second side surface 14 of the element body 10A, on which the dissimilar-material layer 34 is provided, extend in the L direction, which is the lamination direction in the element body 10A, and thus, it can be said that the dissimilar-material layers 33 and 34 are provided on the outer surfaces of the element body 10A that extend in the L direction, which is the lamination direction. In addition, both the dissimilar-material layers 33 and 34 are in contact with the coil conductor layers 42*a* to 42*g*, which are exposed between the insulating layers 141*a* to 141*h*.

In FIG. 2 and FIG. 4, although the dissimilar-material layers are provided on the first side surface and the second side surface of the element body, the dissimilar-material layer may be provided on one of the first side surface and the second side surface of the element body. Alternatively, the dissimilar-material layers may be provided on the first main surface and the second main surface of the element body or may be provided on one of the first main surface and the second main surface of the element body. In other words, the dissimilar-material layer may be provided on at least one of the first side surface, the second side surface, the first main surface, and the second main surface of the element body. The dissimilar-material layer may be in contact with the coil conductor layers exposed between the insulating layers.

In the case where the dissimilar-material layer is provided on at least one of the first side surface, the second side surface, the first main surface, and the second main surface of the element body, the dissimilar-material layer may be provided on at least one of the first end surface and the second end surface of the element body.

Second Embodiment

In a multilayer coil component according to the second embodiment of the present disclosure, the lamination direction is perpendicular to a direction in which a mounting surface extends.

Figure 6:
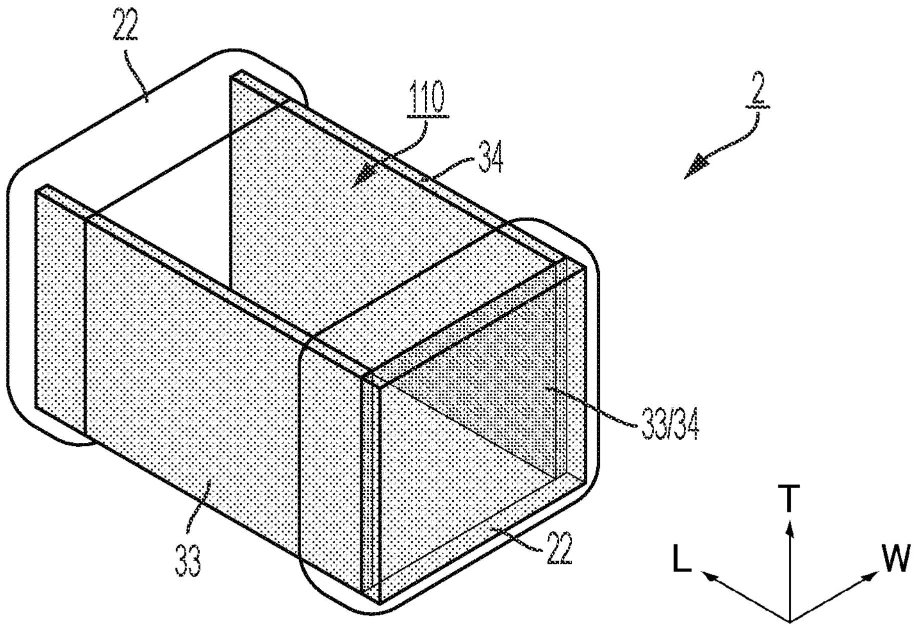
FIG. 6 is a perspective view schematically illustrating an example of a multilayer coil component according to a second embodiment of the present disclosure.

FIG. 6 is a perspective view schematically illustrating an example of the multilayer coil component according to the second embodiment of the present disclosure.

A multilayer coil component 2 that is illustrated in FIG. 6 includes an element body 110, the first and second outer electrodes 21 and 22 that are provided on outer surfaces of the element body 110, and the dissimilar-material layers 33 and 34 each of which is provided on one of the outer surfaces of the element body 110. Although the configuration of the element body 110 will be described later, the element body 110 includes a plurality of insulating layers that are laminated together, and a coil is embedded in the element body 110.

In the multilayer coil component 2 and the element body 110, which are illustrated in FIG. 6, the length direction, the width direction, and the height direction respectively correspond to the L direction, the W direction, and the T direction in FIG. 6. Here, the length direction (L direction), the width direction (W direction), and the height direction (T direction) are perpendicular to one another.

Figure 7:
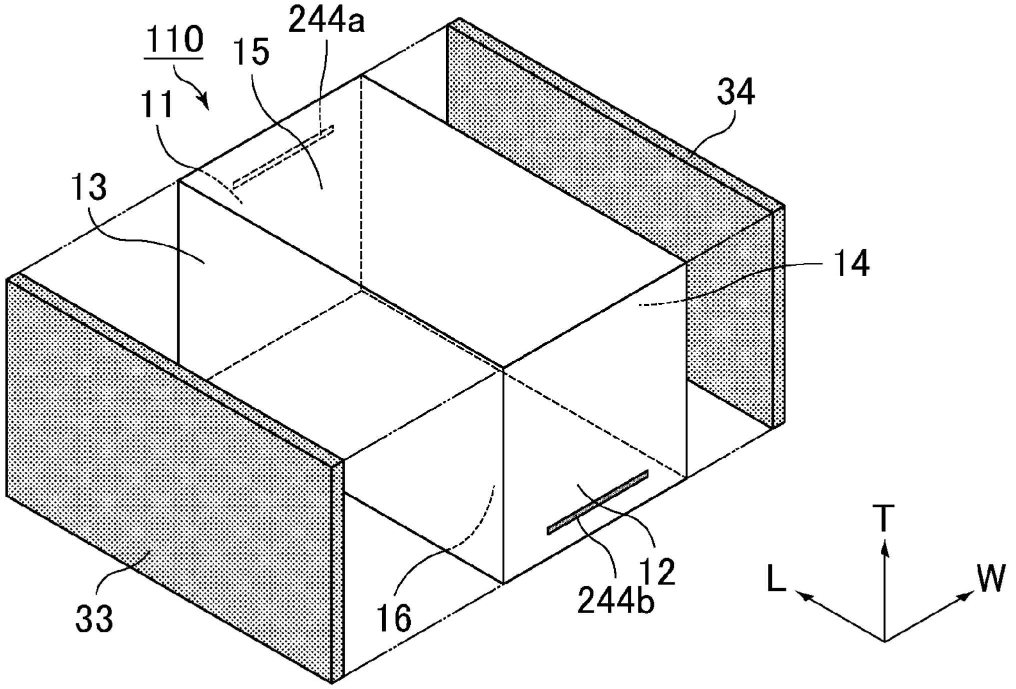
FIG. 7 is an exploded perspective view schematically illustrating examples of an element body and dissimilar-material layers that are included in the multilayer coil component illustrated in FIG. 6.

FIG. 7 is an exploded perspective view schematically illustrating examples of the element body and the dissimilar-material layers that are included in the multilayer coil component illustrated in FIG. 6.

The element body 110 illustrated in FIG. 7 has a rectangular parallelepiped shape or a substantially rectangular parallelepiped shape and has the first end surface 11, the second end surface 12, the first side surface 13, the second side surface 14, the first main surface 15, and the second main surface 16. The first end surface 11 and the second end surface 12 oppose each other in the length direction (L direction). The first side surface 13 and the second side surface 14 oppose each other in the width direction (W direction). The first main surface 15 and the second main surface 16 oppose each other in the height direction (T direction). It is preferable that corner portions and ridge line portions of the element body 110 be rounded.

In FIG. 6, the first outer electrode 21 covers the entire first end surface 11 of the element body 110 and partially covers the first side surface 13, the second side surface 14, the first main surface 15, and the second main surface 16 of the element body 110. The second outer electrode 22 covers the entire second end surface 12 of the element body 110 and partially covers the first side surface 13, the second side surface 14, the first main surface 15, and the second main surface 16 of the element body 110.

Figure 8:
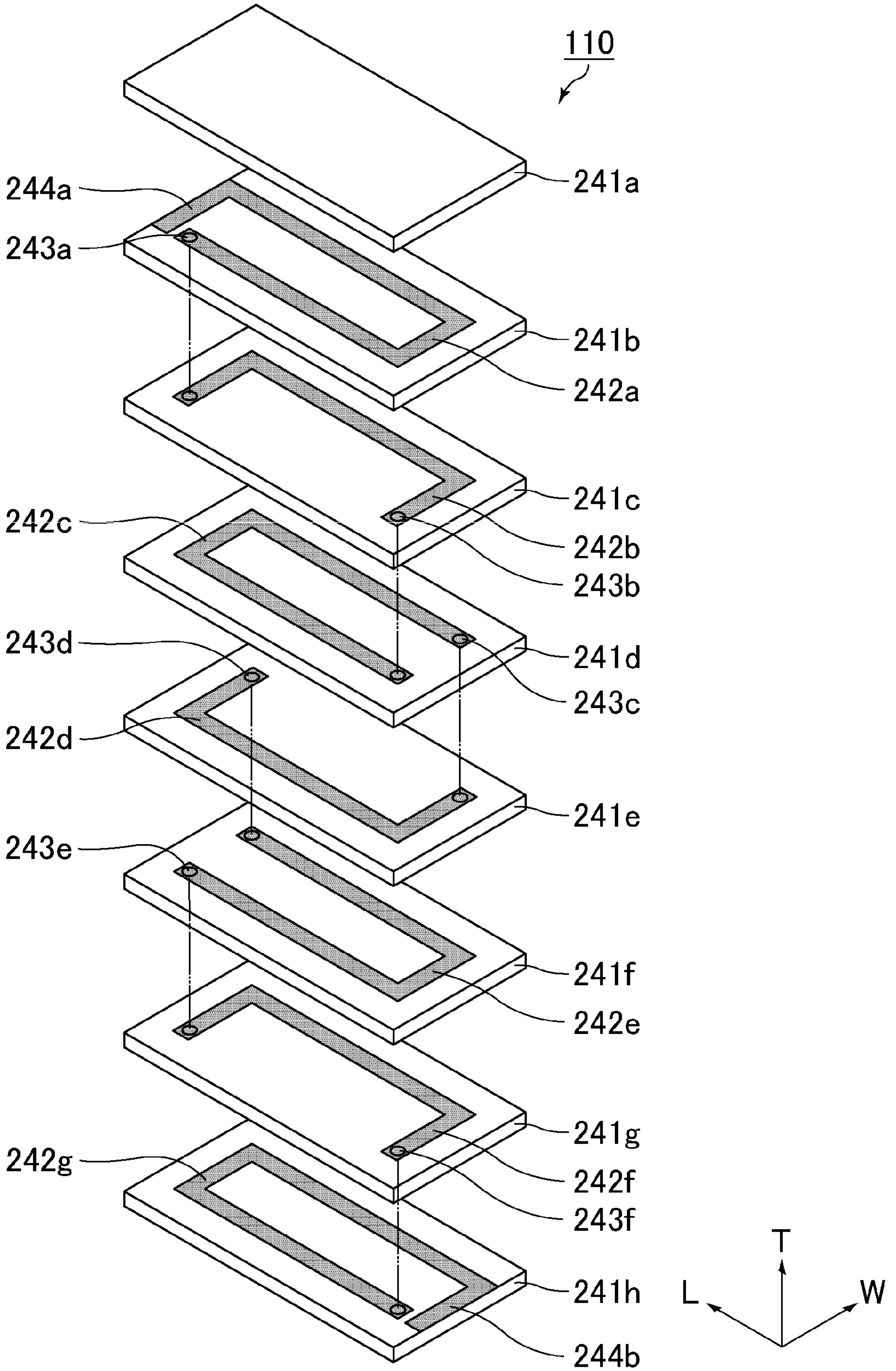
FIG. 8 is an exploded perspective view of the element body illustrated in FIG. 7.

FIG. 8 is an exploded perspective view of the element body illustrated in FIG. 7.

As illustrated in FIG. 8, the element body 110 includes a plurality of insulating layers 241*a*, 241*b*, 241*c*, 241*d*, 241*e*,

241*f*, 241*g*, and 241*h* that are laminated together in the height direction (T direction). Accordingly, in FIG. 6, FIG. 7, and FIG. 8, the height direction (T direction) corresponds to the lamination direction.

The coil conductor layers 242*a*, 242*b*, 242*c*, 242*d*, 242*e*, 242*f*, and 242*g* are respectively formed on main surfaces of the insulating layers 241*b*, 241*c*, 241*d*, 241*e*, 241*f*, 241*g*, and 241*h*. Each of the coil conductor layers 242*a* to 242*g* has a substantially cornered U-shape and has a length of about ¾ turns.

In addition, via conductors 243*a*, 243*b*, 243*c*, 243*d*, 243*e*, and 243*f* are respectively formed in the insulating layers 241*b*, 241*c*, 241*d*, 241*e*, 241*f*, and 241*g* such that these via conductors extend through the corresponding insulating layers in the lamination direction (the T direction in FIG. 8). A land is usually provided on the main surface of each of these insulating layers so as to be connected to the corresponding via conductor.

As described above, the coil conductor layers 242*a* to 242*g*, which are arranged between the insulating layers 241*a* to 241*h*, and the via conductors 243*a* to 243*f*, which extend through the insulating layers 241*a* to 241*h* in the lamination direction, are connected to one another, so that the coil that has a coil axis extending in the T direction is formed.

As illustrated in FIG. 8, the coil conductor layer 242*a* includes an extended portion 244*a*. As illustrated in FIG. 7, the extended portion 244*a* is exposed at the first end surface 11 of the element body 110, and the coil conductor layer 242*a* and the first outer electrode 21 are connected to each other by the extended portion 244*a*. Similarly, as illustrated in FIG. 8, the coil conductor layer 242*g* includes an extended portion 244*b*. As illustrated in FIG. 7, the extended portion 244*b* is exposed at the second end surface 12 of the element body 110, and the coil conductor layer 242*g* and the second outer electrode 22 are connected to each other by the extended portion 244*b*. Thus, the first outer electrode 21 and the second outer electrode 22 are each electrically connected to the coil.

As illustrated in FIG. 7, the dissimilar-material layer 33 is provided on the first side surface 13 of the element body 110, and the dissimilar-material layer 34 is provided on the second side surface 14 of the element body 110.

The first side surface 13 of the element body 110, on which the dissimilar-material layer 33 is provided, and the second side surface 14 of the element body 110, on which the dissimilar-material layer 34 is provided, extend in the T direction, which is the lamination direction in the element body 110, and thus, it can be said that the dissimilar-material layers 33 and 34 are provided on the outer surfaces of the element body 110 that extend in the T direction, which is the lamination direction.

In the case where the multilayer coil component 2, which is illustrated in FIG. 6, is mounted onto a substrate, the first main surface 15 or the second main surface 16 of the element body 110 serves as the mounting surface. Thus, in the multilayer coil component 2, which is illustrated in FIG. 6, the lamination direction (the T direction in FIG. 6) is perpendicular to a direction in which the mounting surface extends.

Figure 9:
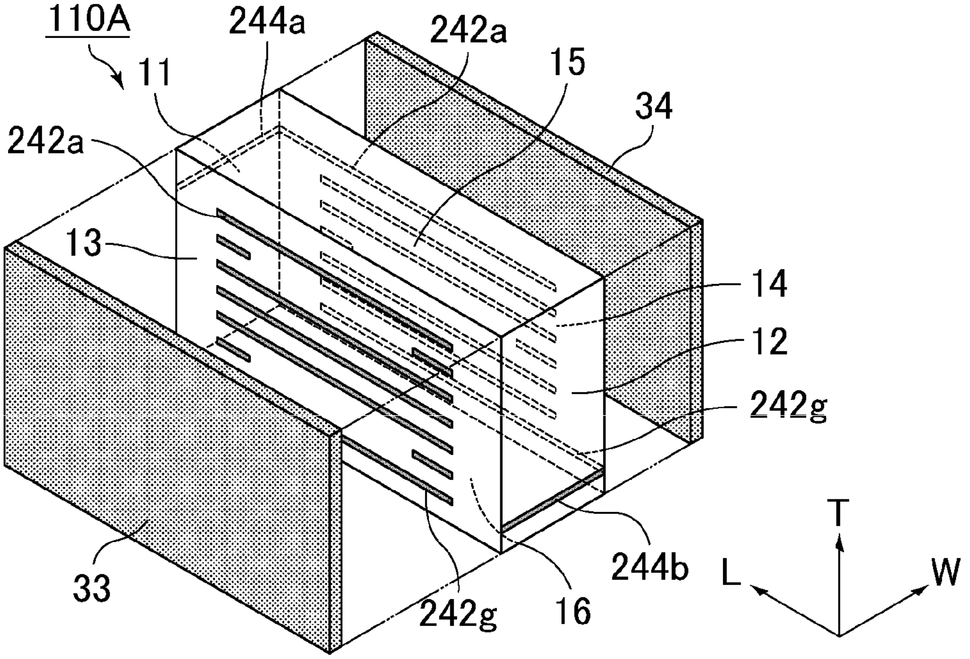
FIG. 9 is an exploded perspective view schematically illustrating other examples of the element body and the dissimilar-material layers that are included in the multilayer coil component according to the second embodiment of the present disclosure.

FIG. 9 is an exploded perspective view schematically illustrating other examples of the element body and the dissimilar-material layers that are included in the multilayer coil component according to the second embodiment of the present disclosure.

An element body 110A that is illustrated in FIG. 9 has a rectangular parallelepiped shape or a substantially rectangular parallelepiped shape and has the first end surface 11, the second end surface 12, the first side surface 13, the second side surface 14, the first main surface 15, and the second main surface 16. The first end surface 11 and the second end surface 12 oppose each other in the length direction (L direction). The first side surface 13 and the second side surface 14 oppose each other in the width direction (W direction). The first main surface 15 and the second main surface 16 oppose each other in the height direction (T direction). It is preferable that corner portions and ridge line portions of the element body 110A be rounded.

Figure 10:
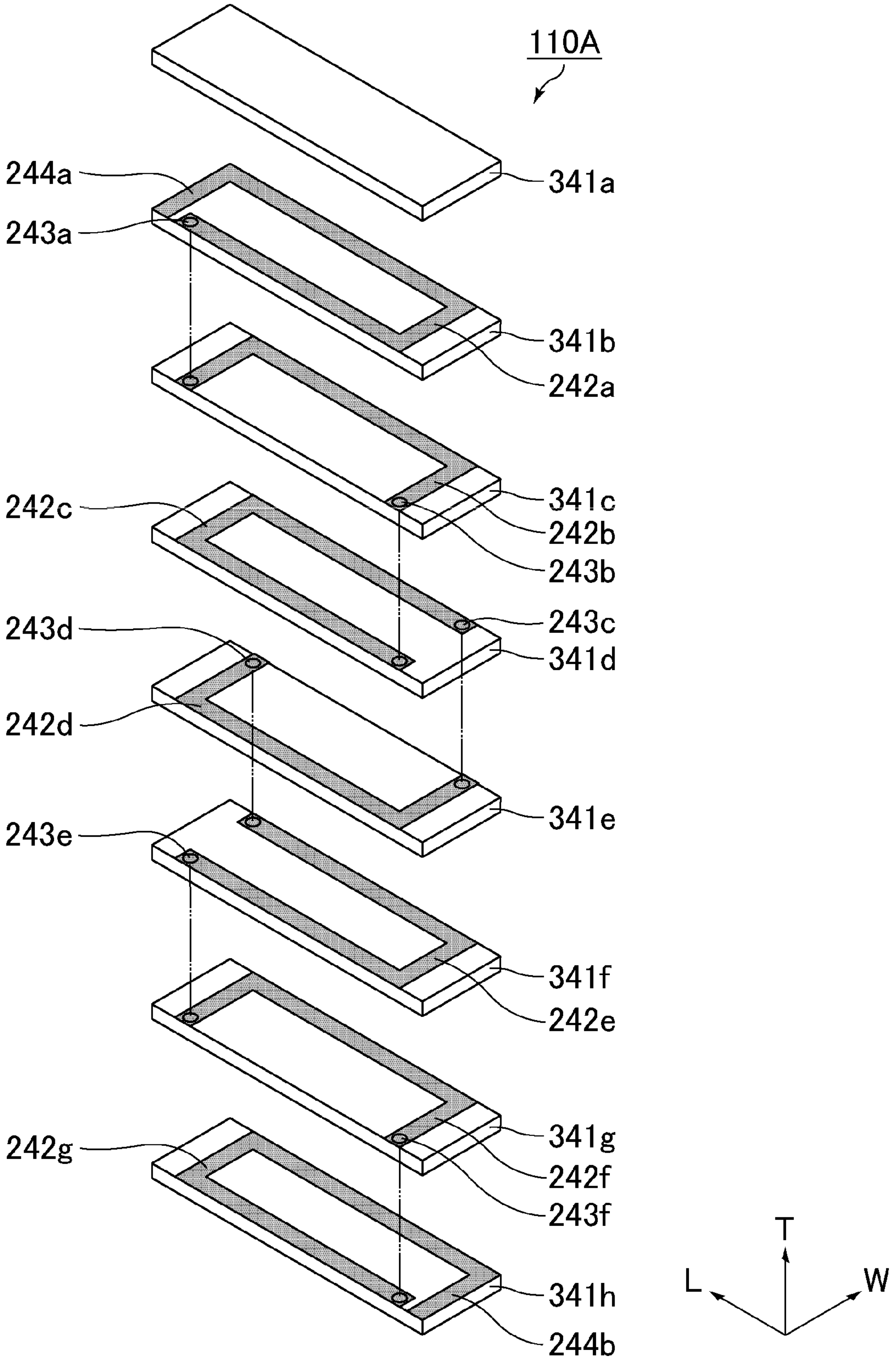
FIG. 10 is an exploded perspective view of the element body illustrated in FIG. 9.

FIG. 10 is an exploded perspective view of the element body illustrated in FIG. 9.

As illustrated in FIG. 10, the element body 110A includes a plurality of insulating layers 341*a*, 341*b*, 341*c*, 341*d*, 341*e*, 341*f*, 341*g*, and 341*h* that are laminated together in the height direction (T direction). Accordingly, in FIG. 9 and FIG. 10, the height direction (T direction) corresponds to the lamination direction.

The coil conductor layers 242*a*, 242*b*, 242*c*, 242*d*, 242*e*, 242*f*, and 242*g* are respectively formed on main surfaces of the insulating layers 341*b*, 341*c*, 341*d*, 341*e*, 341*f*, 341*g*, and 341*h*. Each of the coil conductor layers 242*a* to 242*g* has a substantially cornered U-shape and has a length of about ¾ turns.

In addition, the via conductors 243*a*, 243*b*, 243*c*, 243*d*, 243*e*, and 243*f* are respectively formed in the insulating layers 341*b*, 341*c*, 341*d*, 341*e*, 341*f*, and 341*g* such that these via conductors extend through the corresponding insulating layers in the lamination direction (the T direction in FIG. 10). A land is usually provided on the main surface of each of these insulating layers so as to be connected to the corresponding via conductor.

As described above, the coil conductor layers 242*a* to 242*g*, which are arranged between the insulating layers 341*a* to 341*h*, and the via conductors 243*a* to 243*f*, which extend through the insulating layers 341*a* to 341*h* in the lamination direction, are connected to one another, so that the coil that has a coil axis extending in the T direction is formed.

As illustrated in FIG. 10, the coil conductor layer 242*a* includes the extended portion 244*a*. As illustrated in FIG. 9, the extended portion 244*a* is exposed at the first end surface 11 of the element body 110A, and the coil conductor layer 242*a* and the first outer electrode 21 are connected to each other by the extended portion 244*a*. Similarly, as illustrated in FIG. 10, the coil conductor layer 242*g* includes an extended portion 244*b*. As illustrated in FIG. 9, the extended portion 244*b* is exposed at the second end surface 12 of the element body 110A, and the coil conductor layer 242*g* and the second outer electrode 22 are connected to each other by the extended portion 244*b*. Thus, the first outer electrode 21 and the second outer electrode 22 are each electrically connected to the coil.

The element body 110A illustrated in FIG. 9 has a configuration that is similar to that of the element body 110 illustrated in FIG. 7 except that the coil conductor layers 242*a* to 242*g* are exposed between the insulating layers 341*a* to 341*h*.

As illustrated in FIG. 9, the dissimilar-material layer 33 is provided on the first side surface 13 of the element body 110A, and the dissimilar-material layer 34 is provided on the second side surface 14 of the element body 110A.

The first side surface 13 of the element body 110A, on which the dissimilar-material layer 33 is provided, and the second side surface 14 of the element body 110A, on which the dissimilar-material layer 34 is provided, extend in the T direction, which is the lamination direction in the element body 110A, and thus, it can be said that the dissimilar-material layers 33 and 34 are provided on the outer surfaces of the element body 110A that extend in the T direction, which is the lamination direction. In addition, both the dissimilar-material layers 33 and 34 are in contact with the coil conductor layers 242*a* to 242*g*, which are exposed between the insulating layers 341*a* to 341*h*.

In FIG. 7 and FIG. 9, although the dissimilar-material layers are provided on the first side surface and the second side surface of the element body, the dissimilar-material layer may be provided on one of the first side surface and the second side surface of the element body. Alternatively, the dissimilar-material layers may be provided on the first end surface and the second end surface of the element body or may be provided on one of the first end surface and the second end surface of the element body. In other words, the dissimilar-material layer may be provided on at least one of the first side surface, the second side surface, the first end surface, and the second end surface of the element body. The dissimilar-material layer may be in contact with the coil conductor layers exposed between the insulating layers.

In the case where the dissimilar-material layer is provided on at least one of the first side surface, the second side surface, the first end surface, and the second end surface of the element body, the dissimilar-material layer may be provided on at least one of the first main surface and the second main surface of the element body.

As described in the First Embodiment and the Second Embodiment, the multilayer coil component of the present disclosure is formed in a manner that the dissimilar-material layer that is made of a material different from the material of the insulating layers is provided on at least one of the outer surfaces of the element body that extend in the lamination direction.

In the multilayer coil component of the present disclosure, characteristics of the multilayer coil component such as the inductance and the strength of the multilayer coil component can be changed by changing the material of the dissimilar-material layer that is provided on at least one of the outer surfaces of the element body.

In the multilayer coil component of the present disclosure, examples of the material of the insulating layers include inorganic materials such as a glass material and a ferrite material, organic materials such as an epoxy resin, a fluorocarbon resin and a polymer resin, and a composite material such as a glass epoxy resin.

In the multilayer coil component of the present disclosure, although the material of the dissimilar-material layer is not particularly limited as long as the material is different from the material of the insulating layers, it is preferable that the dissimilar-material layer contain an inorganic material.

Examples of the inorganic material include a ferrite material, a metal magnetic material, and crystallized glass. For example, in the case where the insulating layers are made of a glass material, it is preferable that the dissimilar-material layer contain a ferrite material or a metal magnetic material. In addition, in the case where the insulating layers are made of a glass material, it is preferable that the dissimilar-material layer contain crystallized glass.

In the case where the dissimilar-material layer contains a ferrite material or a metal magnetic material, the inductance of the multilayer coil component can be increased, and the strength, such as flexural strength, of the multilayer coil component can be improved.

In the case where the dissimilar-material layer contains crystallized glass, the strength, such as flexural strength, of the multilayer coil component can be improved.

In the multilayer coil component of the present disclosure, in the case where the dissimilar-material layers are provided on two or more of the outer surfaces of the element body, the dissimilar-material layers, which are provided on these surfaces, may be made of the same material or may be made of different materials.

In the multilayer coil component of the present disclosure, it is preferable that the thickness of the dissimilar-material layer be about 5 μm or larger and about 50 μm or smaller (i.e., from about 5 μm to about 50 μm), and more preferably, about 10 μm or larger and about 40 μm or smaller (i.e., from about 10 μm to about 40 μm).

When the thickness of the dissimilar-material layer is set within the above range, the size of the multilayer coil component can be reduced.

In the multilayer coil component of the present disclosure, in the case where the dissimilar-material layers are provided on two or more of the outer surfaces of the element body, the dissimilar-material layers, which are provided on these surfaces, may have the same thickness or may have different thicknesses.

The thickness of the dissimilar-material layer is measured by a method that will be described below.

A sample is placed so as to stand vertically, and a resin is cured so as to surround the sample, so that, for example, an LT side surface of the sample is exposed.

The sample is ground by using a grinder, and the grinding is finished when about one-half of the depth of the sample in the W direction has been ground such that the LT cross section of the sample is exposed.

In order to eliminate uneven grinding of the coil conductor layer due to the grinding, after the grinding has been finished, the ground surface is processed by ion milling (using ion milling system IM4000 manufactured by Hitachi High-Technologies Corporation).

Images of dissimilar-material layers are captured by a scanning electron microscope (SEM), and the thicknesses of the dissimilar-material layers are measured from the captured images. The measurement is performed on three portions of each of the dissimilar-material layers. The average of the thicknesses of the three portions is calculated, and the average is defined as the thickness of the dissimilar-material layer.

In the multilayer coil component of the present disclosure, the dissimilar-material layer may be provided on at least one of the outer surfaces of the element body that extend in the lamination direction. The dissimilar-material layers may be provided on two of the outer surfaces of the element body that extend in the lamination direction, the two outer surfaces being adjacent to each other, or may be provided on two of the outer surfaces of the element body that extend in the lamination direction, the two outer surfaces opposing to each other. Alternatively, the dissimilar-material layers may be provided on all the outer surfaces of the element body. In the case where the dissimilar-material layers are provided on two of the outer surfaces of the element body, the two outer surfaces opposing to each other, it is preferable that the dissimilar-material layers be provided on the two outer surfaces of the element body each of which has an area larger than that of each of the other two outer surfaces of the element body. It is preferable that the dissimilar-material layer not be provided on portions of the outer surfaces of the element body at which the coil is connected to the first outer electrode or the second outer electrode.

In the multilayer coil component of the present disclosure, the dissimilar-material layers may be provided not only on the outer surfaces of the element body that extend in the lamination direction but also on the outer surfaces of the element body that extend in a direction perpendicular to the lamination direction.

In the multilayer coil component of the present disclosure, the dissimilar-material layers may be provided on the entirety or a portion of each of the outer surfaces of the element body.

In the multilayer coil component of the present disclosure, the dissimilar-material layers that are provided on the outer surfaces of the element body that extend in the lamination direction may be in contact with the coil conductor layers that are exposed between the insulating layers.

In this case, the size of the multilayer coil component can be reduced by reducing the thicknesses of portions between the coil conductor layers and the dissimilar-material layers.

In the multilayer coil component of the present disclosure, in the case where the dissimilar-material layers are provided on two or more of the outer surfaces of the element body that extend in the lamination direction, the dissimilar-material layer that is provided on at least one of the outer surfaces may be in contact with the coil conductor layers that are exposed between the insulating layers.

An example of a method of manufacturing the multilayer coil component of the present disclosure will be described below.

In the following example, a method of manufacturing multilayer coil components when a plurality of multilayer coil components are manufactured at the same time will be described.

First, a photosensitive glass paste for insulating layers is prepared.

More specifically, a photosensitive glass paste is formed by containing a binder polymer, a photopolymerizable monomer, a photosensitive organic component that contains a photopolymerization initiator, and glass powder.

As the glass powder, for example, it is preferable to use $SiO_2$—$B_2O_3$-based glass, $SiO_2$—$B_2O_3$—$K_2O$-based glass, $SiO_2$—$B_2O_3$—$Li_2O$—CaO-based glass, $SiO_2$—$B_2O_3$—$Li_2O$—CaO—ZnO-based glass, $Bi_2O_3$—$B_2O_3$—$SiO_2$—$Al_2O_3$-based glass, or the like.

In addition, the photosensitive glass paste may contain a filler such as quartz, alumina, silica or forsterite as necessary.

Similarly, a photosensitive silver paste is formed by containing a binder polymer, a photopolymerizable monomer, a photosensitive organic component that contains a photopolymerization initiator, and silver powder. Metal powder that is different from the silver powder may be used.

The photosensitive glass paste is applied to a film base member, and ultraviolet rays are radiated onto the entire surface of the film base member, so that an insulating layer is formed. Next, the photosensitive silver paste is applied to the insulating layer, and exposure and development are performed on the photosensitive silver paste, so that a coil conductor layer is formed.

Subsequently, the photosensitive glass paste is applied to the insulating layer and the coil conductor layer. In addition, exposure and development are performed so as to form an insulating layer in which a via hole is formed at a position where a via conductor is to be formed. The photosensitive silver paste is applied to the insulating layer, and exposure and development are performed, so that a coil conductor layer and the via conductor are formed. After that, steps similar to the steps of forming the insulating layers, the coil conductor layers, and the via conductor are repeatedly performed. In the manner described above, a mother multilayer body that includes a plurality of element bodies is manufactured.

The mother multilayer body is cut into the individual element bodies by, for example, press cutting. After that, the element bodies are fired at a predetermined temperature for a predetermined time.

Dissimilar-material layers are formed on outer surfaces of the element bodies that have been fired or outer surfaces of the element bodies that have not yet been fired. In this manner, the dissimilar-material layers may be formed on the outer surfaces of the element bodies that have been fired or may be formed on the outer surfaces of the element bodies that have not yet been fired. For example, the dissimilar-material layers can be formed by attaching sheets each of which is made of a dissimilar material to the outer surfaces or by applying a dissimilar material to the outer surfaces.

In the case where the dissimilar-material layers are formed on the outer surfaces of the element bodies that have been fired, it is preferable that dissimilar-material sheets be provided onto the outer surfaces of the element bodies that have been fired. For example, dissimilar-material sheets each having a predetermined size and a predetermined thickness are fabricated, and the dissimilar-material sheets are attached to target surfaces with an adhesive such as an epoxy resin, so that the dissimilar-material layers can be formed.

In the case where the dissimilar-material layers are formed on the outer surfaces of the element bodies that have not yet been fired, it is preferable that green sheets each of which is made of a dissimilar material be provided onto the outer surfaces of the element bodies, which have not yet been fired, and that the green sheets and the element bodies be fired at the same time. For example, green sheets each of which is made of a dissimilar material are fabricated, and target surfaces of the element bodies are pressed against the green sheets that have been heated, so that the dissimilar material can be provided. After that, the element bodies and the green sheets, each of which is made of a dissimilar material, are fired at the same time, so that the dissimilar-material layers can be formed.

In the case where each of the dissimilar-material layers contains a ferrite material, it is preferable that an Ni—Zn—Cu ferrite material be used.

As the ferrite material, a material that contains, as main components, about 40 mol % or more and about 49.5 mol % or less (i.e., from about 40 mol % to about 49.5 mol %) of Fe in terms of $Fe_2O_3$, about 2 mol % or more and about 35 mol % or less (i.e., from about 2 mol % to about 35 mol %) of Zn in terms of ZnO, and about 4 mol % or more and about 12 mol % or less (i.e., from about 4 mol % to about 12 mol %) of Cu in terms of CuO, and the balance of which is NiO is used. The composition of the material is selected in accordance with required characteristics.

In addition, the material may contain a trace additive (including incidental impurities) such as Bi, Sn, Mn, or Co.

In the case where each of the dissimilar-material layers contains a metal magnetic material, it is preferable that a composite material of metallic magnetic powder and glass be used.

For example, metallic magnetic powder such as Fe—Si-based alloy, Fe—Si—Cr-based alloy, Fe—Si—Al-based alloy, Fe—Ni alloy, Fe—Co alloy, Fe—Si—B—P—Cu—C-based alloy, or Fe—Si—B—Nb—Cu-based alloy is used.

A composite material that is obtained by containing $SiO_2$—$B_2O_3$-based glass or $SiO_2$—$B_2O_3$—$K_2O$-based glass in the above metallic magnetic powder is used. Alternatively, a composite material that is obtained by containing a resin in the above metallic magnetic powder may be used.

In the case where each of the dissimilar-material layers contains crystallized glass, it is preferable that crystallized glass including Si, B, and an alkaline-earth metal be used.

After the firing has been performed, barrel polishing is performed on the element bodies on which the dissimilar-material layers have been formed so as to round the edges of the element bodies and so as to remove burrs, and as a result, extended portions are exposed from the element bodies.

After that, the first outer electrode and the second outer electrode are formed on the outer surfaces of each of the element bodies, on which the dissimilar-material layers have been formed. For example, the outer surfaces of each of the element bodies, on which the dissimilar-material layers have been formed, are dipped into a silver paste, and the silver paste is baked, so that silver electrodes are formed. Finally, nickel plating, copper plating, zinc plating, or the like is performed on the silver electrodes, so that the outer electrodes are formed. The multilayer coil component is obtained through the above steps.

Other Embodiments

The multilayer coil component of the present disclosure is not limited to the above-described embodiments, and various applications and modifications can be made to the configuration, the manufacturing conditions, and so forth of the multilayer coil component within the scope of the present disclosure.

For example, the number of the insulating layers, the shape and the material of each of the insulating layers, the length, the shape, and the material of each of the coil conductor layers, the number of the via conductors, the positions of the via conductors, the shape and the material of each of the via conductors, the configuration of the coil, the shape and the material of each of the outer electrodes, the method of forming the outer electrodes, the method of connecting the coil and each of the outer electrodes, and so forth are not particularly limited. For example, the length of each of the coil conductor layers is not limited to about ¾ turns and may be, for example, about ½ turns. The shape of each of the coil conductor layers may be cornered or may be rounded. In addition, the coil does not need to be formed of the plurality of coil conductor layers and the via conductors connected to one another, and for example, the coil may be formed of a single coil conductor layer.

In the multilayer coil component of the present disclosure, the method of forming each of the outer electrodes may be a method in which an electrode conductor layer that is embedded in the element body is exposed by cutting and in which plating is performed on the electrode conductor layer.

In the case where the lamination direction is the same as a direction in which the mounting surface extends, the lamination direction may be the L direction or may be the W direction.

In the above embodiments, a case where the multilayer coil component is manufactured by a photolithography method has been described.

Figure 11:
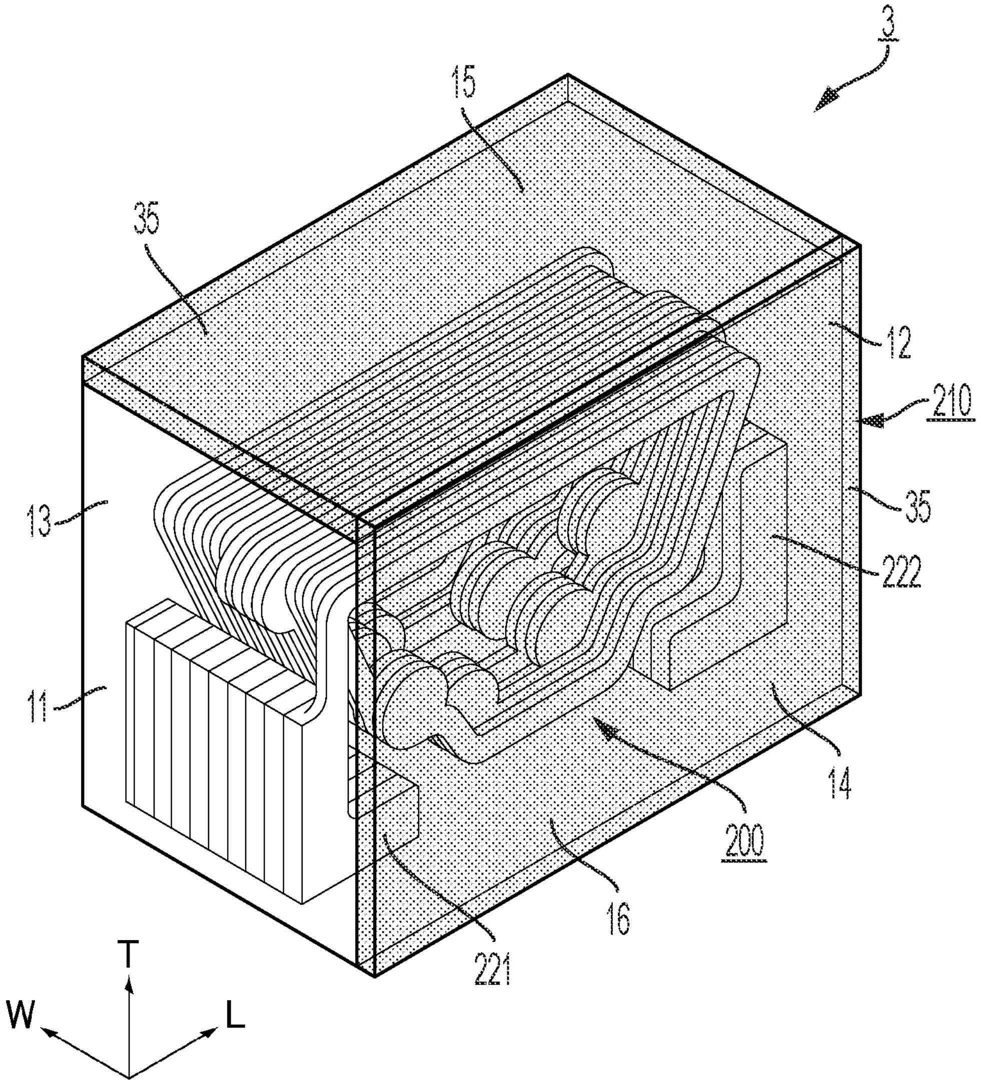
FIG. 11 is a see-through perspective view schematically illustrating an example of a multilayer coil component manufactured by a photolithography method.

FIG. 11 is a see-through perspective view schematically illustrating an example of a multilayer coil component manufactured by the photolithography method.

A multilayer coil component 3 that is illustrated in FIG. 11 includes an element body 210, a first outer electrode 221, a second outer electrode 222, and a dissimilar-material layer 35. The first outer electrode 221 and the second outer electrode 222 are provided on some of outer surfaces of the element body 210, and the dissimilar-material layer 35 is provided on one of the outer surfaces of the element body 210. The element body 210 includes a plurality of insulating layers (not illustrated) that are laminated together, and a coil 200 is embedded in the element body 210. In FIG. 11, the width direction (W direction) corresponds to the lamination direction.

In FIG. 11, the first outer electrode 221 is a substantially L-shaped electrode that is formed so as to extend to both the first end surface 11 and the second main surface 16 of the element body 210, and the second outer electrode 222 is a substantially L-shaped electrode that is formed so as to extend to both the second end surface 12 and the second main surface 16 of the element body 210. Note that the first outer electrode 221 and the second outer electrode 222 may be electrodes each of which is provided only on the second main surface 16 of the element body 210.

As described above, by embedding the first outer electrode and the second outer electrode in the element body, reduction in the size of the multilayer coil component can be facilitated, whereas in the case of a configuration in which the first outer electrode and the second outer electrode is externally attached to the element body, reduction in the size of the multilayer coil component is not facilitated.

Although a detailed description will be omitted, a plurality of coil conductor layers that are provided between the insulating layers and via conductors that extend through the insulating layers in the lamination direction are connected to one another, so that the coil 200 that has a coil axis extending in the W direction is formed.

It is preferable that the coil 200 be formed in the same step as the first outer electrode 221 and the second outer electrode 222. A first end of the coil 200 is connected to the first outer electrode 221, and a second end of the coil 200 is connected to the second outer electrode 222. Accordingly, the first outer electrode 221 and the second outer electrode 222 are each electrically connected to the coil 200.

As illustrated in FIG. 11, the dissimilar-material layer 35 is provided on the first main surface 15 of the element body 210.

The first main surface 15 of the element body 210, on which the dissimilar-material layer 35 is provided, extends in the W direction, which is the lamination direction in the element body 210, and thus, it can be said that the dissimilar-material layer 35 is provided on the outer surface of the element body 210 that extends in the W direction, which is the lamination direction.

In FIG. 11, although the dissimilar-material layer 35 is provided on the first main surface 15 of the element body 210, for example, in the case where the first outer electrode 221 is not provided on the first end surface 11 of the element body 210, and where the second outer electrode 222 is not provided on the second end surface 12 of the element body 210, the dissimilar-material layers may be provided on the first end surface 11 and the second end surface 12 of the element body 210, or the dissimilar-material layer may be provided on one of the first end surface 11 and the second end surface 12 of the element body 210. In addition, the dissimilar-material layer may also be provided on at least one of the first side surface 13 and the second side surface 14 of the element body 210.

In the case where the multilayer coil component 3 illustrated in FIG. 11 is mounted onto a substrate, the second main surface 16 of the element body 210 serves as the mounting surface. Thus, in the multilayer coil component 3, which is illustrated in FIG. 11, the lamination direction (the W direction in FIG. 11) is the same as a direction in which the mounting surface extends.

In the present disclosure, the multilayer coil component is not necessarily manufactured by a photolithography method, and for example, the multilayer coil component may be manufactured by a sheet lamination method in which insulating sheets that are to be insulating layers and on which coil-conductor-layer patterns have been formed are laminated together, or the multilayer coil component may be manufactured by a printing lamination method in which application of an insulating paste and application of an electrically conductive paste are repeatedly performed so as to sequentially form insulating layers and coil-conductor-layer patterns.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

an element body that includes a plurality of insulating layers laminated together;

a coil that is embedded in the element body and that includes a coil conductor layer provided between the insulating layers;

a first outer electrode and a second outer electrode each of which is provided on at least one of outer surfaces of the element body and each of which is electrically connected to the coil; and first and second dissimilar-material layers that are made of a material different from the insulating layers, wherein the first dissimilar-material layer is provided on at least one of the outer surfaces of the element body that extends in a direction parallel to a lamination direction in which the plurality of insulating layers are laminated together and perpendicular to a mounting surface, the plurality of insulating layers are made of glass material, portions of the coil conductor layer are exposed between the insulating layers, and the second dissimilar-material layer is provided on another outer surface of the element body that extends in a direction perpendicular to the at least one of the outer surfaces of the element body and to the mounting surface.

2. The multilayer coil component according to claim 1, wherein the first dissimilar-material layer is at least provided on two of the outer surfaces of the element body that extend in the lamination direction, the two surfaces opposing each other.

3. The multilayer coil component according to claim 1, wherein the first and second dissimilar-material layers include an inorganic material.

4. The multilayer coil component according to claim 3, wherein the inorganic material is a ferrite material or a metal magnetic material.

5. The multilayer coil component according to claim 3, wherein the inorganic material is crystallized glass.

6. The multilayer coil component according to claim 1, wherein a thickness of the first and second dissimilar-material layers is from 5 μm to 50 μm.

7. The multilayer coil component according to claim 1, wherein the lamination direction is the same as a direction in which the mounting surface extends.

8. The multilayer coil component according to claim 1, wherein the lamination direction is perpendicular to a direction in which the mounting surface extends.

9. The multilayer coil component according to claim 1, wherein the first dissimilar-material layer is in contact with the coil conductor layer, which is exposed between the insulating layers.

10. The multilayer coil component according to claim 2, wherein the first and second dissimilar-material layers include an inorganic material.

11. The multilayer coil component according to claim 2, wherein a thickness of the first and second dissimilar-material layers is from 5 μm to 50 μm.

12. The multilayer coil component according to claim 2, wherein the lamination direction is the same as a direction in which the mounting surface extends.

13. The multilayer coil component according to claim 2, wherein the lamination direction is perpendicular to a direction in which the mounting surface extends.

14. The multilayer coil component according to claim 2, wherein the first dissimilar-material layer is in contact with the coil conductor layer, which is exposed between the insulating layers.

15. The multilayer coil component according to claim 1, wherein the first and second dissimilar-material layers include a metal magnetic material, and the first dissimilar-material layer is in contact with the coil conductor layer, which is exposed between the insulating layers.

16. A multilayer coil component comprising:

an element body that includes a plurality of insulating layers laminated together;

a coil that is embedded in the element body and that includes a coil conductor layer provided between the insulating layers;

a first outer electrode and a second outer electrode each of which is provided on at least one of outer surfaces of the element body and each of which is electrically connected to the coil; and first and second dissimilar-material layers that are made of a material different from the insulating layers, wherein the first dissimilar-material layer is provided on at least one of the outer surfaces of the element body that extends in a direction parallel to a lamination direction in which the plurality of insulating layers are laminated together and perpendicular to a mounting surface, and the second dissimilar-material layer is provided on another outer surface of the element body that extends in a direction perpendicular to the at least one of the outer surfaces of the element body and to the mounting surface.

17. The multilayer coil component according to claim 16, wherein the first and second dissimilar-material layers include a metal magnetic material, and the first dissimilar-material layer is in contact with the coil conductor layer, which is exposed between the insulating layers.

* * * * *